United States Patent [19]

Leonard

[11] E Patent Number: Re. 32,878

[45] Reissued Date of Patent: Feb. 28, 1989

[54] COUNTERBALANCE DEVICE AND TORSION MEMBER USABLE THEREIN

[75] Inventor: George H. Leonard, Darien, Conn.

[73] Assignee: Airpot Corp., Norwalk, Conn.

[21] Appl. No.: 4,177

[22] Filed: Dec. 22, 1986

Related U.S. Patent Documents

Reissue of:

[64] Patent No.: 4,571,775
Issued: Feb. 25, 1986
Appl. No.: 712,757
Filed: Mar. 18, 1985

U.S. Applications:

[63] Continuation of Ser. No. 477,337, Mar. 21, 1983, abandoned.

[51] Int. Cl.[4] ..... E05F 1/10

[52] U.S. Cl. ..... 16/298; 16/308; 16/DIG. 36; 267/154; 267/273

[58] Field of Search ..... 16/303, 306, 308, 298, 16/296, 284, 75; 267/57, 58, 154

[56] References Cited

U.S. PATENT DOCUMENTS

| | | | |
|---|---|---|---|
| 3,022,536 | 2/1962 | Floehr | 16/308 |
| 3,276,762 | 10/1966 | Thomas | 267/154 |
| 3,377,882 | 4/1968 | Schrempp | 16/308 X |
| 3,476,375 | 11/1969 | Brasseur | 16/308 X |
| 4,291,501 | 9/1981 | Steinberg et al. | 16/308 X |
| 4,348,786 | 9/1982 | Hirose | 16/308 X |

FOREIGN PATENT DOCUMENTS

| | | |
|---|---|---|
| 749208 | 11/1944 | Fed. Rep. of Germany . |
| 966825 | 9/1957 | Fed. Rep. of Germany . |
| 2131468 | 1/1972 | Fed. Rep. of Germany . |
| 1102401 | 10/1955 | France . |
| 519524 | 3/1940 | United Kingdom . |

*Primary Examiner*—Douglas D. Watts
*Attorney, Agent, or Firm*—James & Franklin

[57] ABSTRACT

A device for counterbalancing a moving part comprises an elongated torsion member surrounded by a sleeve, the sleeve being connected to the torsion member at one point and the torsion member being fixedly supported at another point spaced from said one point, the moving part and the sleeve respectively carrying cooperating elements of a cam-follower combination, the cam being shaped, taking into account the torsion characteristics of the torsion element, to produce the desired counterbalancing effect. The torsion member itself advantageously comprises a plurality of elongated narrow elements of polygonal cross-section arranged in a predetermined grouping with sides of adjacent elements engaging one another, the exposed surfaces of said elements defining at least in part a polygonal shape, operative connections to points along the length of the torsion member being effected by bodies having appropriately shaped polygonal openings into which the grouping of the narrow elements is received so as to non-rotatably engage at least some of the elements and to confine the elements so that they are maintained in that predetermined grouping. The construction of the torsion member is such that a variety of different torsion element groupings can be received within a given polygonal opening, with a still greater variation in the number of torsion elements being possible by simple modifications of those polygonal openings, so that great latitude in operating characteristics can be achieved with an essentially standardized construction.

22 Claims, 9 Drawing Sheets

FIG.17
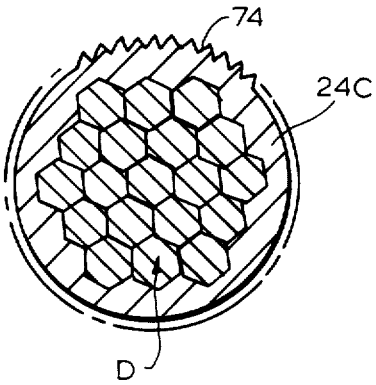
FIG.16
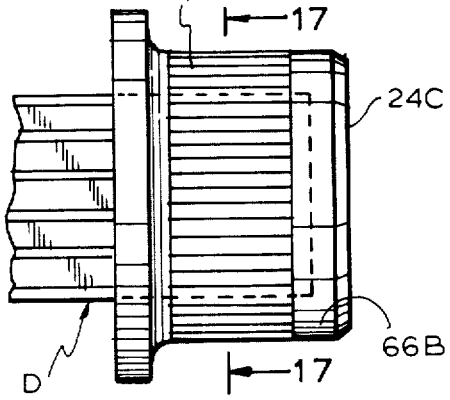
FIG.18
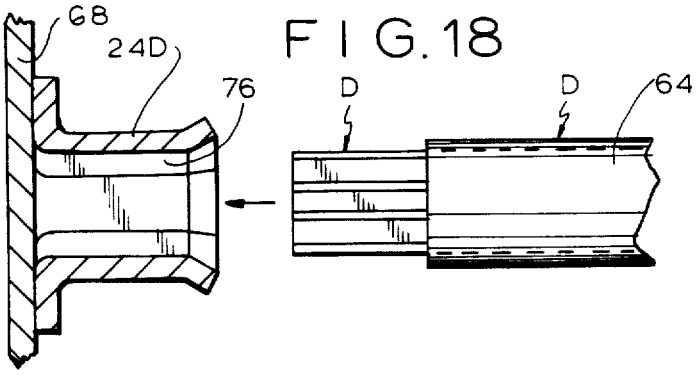
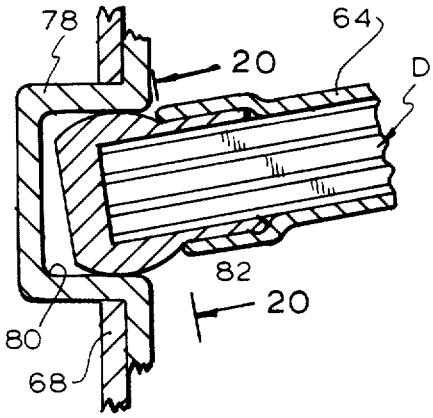
FIG. 19
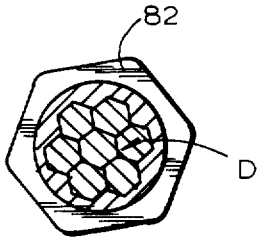
FIG. 20

COUNTERBALANCE DEVICE AND TORSION MEMBER USABLE THEREIN

Matter enclosed in heavy brackets [ ] appears in the original patent but forms no part of this reissue specification; matter printed in italics indicates the additions made by reissue.

This application is a continuation of my earlier application Ser. No. 06/477,337 of Mar. 21, 1983, now abandoned.

The present invention relates to a counterbalance device to act between first and second parts articulately connected to one another, and to a particular torsion member construction peculiarly well-adapted for use therein.

There are many instances where one part is articulately connected to another so as to be movable between first and second positions, the nature of that part being such that its effective weight varies as it thus moves. For example, when a heavy lid is lifted from a horizontal position to a vertical position, it seems heaviest at the beginning of that movement and its effective weight decreases as it moves toward its vertical open position. Hence the force necessary to move it is greatest when the lid is horizontal and least when the lid is vertical, thus creating a tendency to slam the lid into its vertical position and also, because of the effective weight of the lid, tending to cause the lid to slam into its horizontal position. In addition, under normal circumstances, if the lid is released in an intermediate position it will tend to fall back to its horizontal position, usually wtih considerable force. Consequently, counterbalance devices are employed, which are effective to minimize the differences in apparent weight of the lid as it moves from one operative position to the other, and preferably effective to exert a force on the lid at any given intermediate position which is substantially equal and opposite to the force that the lid would normally exert, so that if the lid is released in an intermediate position it will tend to stay in that position.

Actual physical counterbalancing by means of an added and appropriately located weight involves significant problems of weight, space, cost and safety. Therefore many different artificial counterbalancing devices have been proposed, but few if any can produce perfect or neutral counterbalancing (by neutral counterbalancing is meant counterbalancing such that the lid will remain in whatever position it finds itself, and will exert a smooth, low resistance to movement from that position) without complex and expensive structure, and most take up a significant amount of space and add significant weight to the overall construction. Many such devices utilize hydraulic or pneumatic cylinders, which are subject to significant maintenance problems. Springs, including torsion springs, have been used in the past for this purpose, but they either are extremely bulky, heavy and expensive or they can be used only for relatively light work. Even the bulkiest spring hinge becomes unsuitable when truly heavy lids are involved, and for such heavy lids the art has turned to the use of hydraulic shock absorbers or gas springs, but they are significantly more costly, present very substantial space problems, and obstruct side access when the lid is lifted.

Moreover, torsion spring assemblies as used in the past have involved structures individually designed for a particular application. When a new application calling for even a slightly different torsion characteristic is presented, a new and different structure must be designed for that purpose. This adds greatly to the cost of such devices. Moreover, adjustability of such structures, to accommodate external or internal changes or to make a given structure adaptable for use in a plurality of environments, is difficult and unreliable.

It is a prime object of the present invention to provide neutral counterbalancing for heavy lid-like parts, particularly those that swing about a basically horizontal axis.

Another prime object of the present invention is to devise a torsion member construction well adapted for use in such a counterbalance device but also capable of more generalized use, which torsion element is simple, reliable, inexpensive, small, light, easily manufactured, and capable of exerting torsional resistance to light forces or quite heavy forces, all with the same basic design.

It is a further object of the present invention to device such structures in which a counterbalancing force or resistance to torsion can be adjusted over a signifieant range without adversely affecting reliability or cost.

It is another object of the present invention to device such structures which can exert very substantial amounts of torque while taking up a minimal space, having minimal weight, and being significantly inexpensive.

It is an additional object of the present invention to devise such structures which have a very long life and which can be readily repaired in the event that something does go wrong.

Yet a further object of the present invention is to devise such structures which are capable of exerting high maximum torques but which are also "soft" in response, exerting low torques at low rotation and building slowly up to high torques at high rotation.

It is a still further object of the present invention to devise such constructions which are simple, compact, well-protected against adverse external influences, which can be readily installed and removed, which do not obstruct access, and which are also aesthetically pleasing.

It is yet another object of the present invention to devise such structures which can be made from readily available material without requiring high degrees of dimensional tolerance.

It is an additional object of the present invention to devise such structures which can be made from essentially standardized designs, which standardized designs can be readily modified to provide gross variation in operating characteristics and which can be readily adjusted to provide fine control over operating characteristics, so that only a few standardized constructions, using standardized parts, will be capable of accommodating torques from light to very heavy.

Another object of the present invention is to provide such structures which, on a production basis, produce a high degree of uniformity of spring rate, thus minimizing the need for adjustability.

In accordance with the present invention, the above and related objects are achieved by providing the counterbalance device with an elongated torsion member surrounded by a sleeve. At one point the torsion member is fixed to a support, and at another point it is nonrotatably connected to the sleeve. The lid or other part to be counterbalanced is provided with one element of a cam-follower combination, the other element of that combination being non-rotatably connected to the sleeve. Since the torsion characteristics of the torsion member are known, and the apparent weight-position characteristics of the lid are known, the cam can readily be shaped to impart to the system the desired overall counterbalancing characteristics, such as, preferably, a neutral counterbalancing. Simple, compact devices made in this fashion can accommodate lid swings of up to 180° and exert counterbalancing torques varying, purely by way of example, between 0 and 500 inch pounds. The construction is such that balanced torsional effects can be readily achieved. The point along the length of the torsion member where it is secured either to the support or to the sleeve or both can be made adjustable, thereby to modify the operating characteristics, but without sacrifice in the sturdiness and simplicity of the parts.

While many different types of torsion members can be employed, the torsion member construction here disclosed and claimed is exceptionally well suited for use in the disclosed counterbalance device, but is also capable of more generalized use. (Certain aspects of that torsion member construction are shown in my copending application Ser. No. 422,838, filed Sept. 24, 1982, and entitled "Spring Hinge", which is assigned to the assignee of this application.) The preferred torsion member is formed of a plurality of elongated narrow torsion elements of polygonal, and preferably essentially regular polygonal cross-section arranged in a predetermined grouping, with sides of adjacent elements engaging one another, the exposed surfaces of those elements defining at least in part a polygonal shape. Nonrotative engagement with the torsion member at a given point along its length is achieved by means of simple bushing-like parts having polygonal openings into which the grouping of elongated torsion elements is received, the shape of those openings being so related to the shape of the periphery of that grouping as to non-rotatably engage at least some of said elements and to confine said elements so that they are maintained in said predetermined grouping. In most cases the polygonal opening in a given bushing-like part is capable of receiving groups of different numbers of elongated torsion elements without sacrifice of the desired operating conditions, and that capability may be extended through the use of dummy torsion elements or other inserts. Thus a single standard construction can produce torsion members having widely varying torque characteristics—a grouping formed of a lesser number of elongated elements will produce a lesser torque for a given angular displacement than will a torsion member having a greater number of such elongated elements.

Moreover, that bushing-like part in many cases can readily be slid along the length of the torsion member, thus varying the location of the point where it engages the torsion member, thereby to vary the effective length of the torsion member, and hence its torque characteristic—the greater the effective length, the less the torque that need be exerted for a given angular displacement.

Further variation in the torque characteristics which can be produced from a given standardized construction is afforded through the ability to utilize elongated narrow torsion elements of different cross-sectional sizes in the same group.

The grouping of torsion elements is inherently exceedingly reliable and long-lived, but its reliability may be even further enhanced by surrounding it by a sheath of protective material, which will not only protect the torsion elements against adverse external influences such as moisture, grit or acid, but can also be used to assist in confining those elements to their proper locations within the grouping and to retain grease or other lubricant in position.

The points where the part to be counterbalanced and its support engage the group of torsion elements can be appreciably spaced from one another, thus producing torsion members of substantial length, so that the possibility of overstressing of the torsion elements is minimized. Moreover, one securing point can be intermediate the length of the torsion member, while the other points (in duplicate) are at the ends of the torsion member, thus producing a desirable balanced construction.

To the accomplishment of the above, and to such other objects as may hereinafter appear, the present invention relates to a counterbalance device and to a torsion member construction well adapted for use therein, as defined in the appended claims, and as described in this specification, taken together with the accompanying drawings in which:

Figure 9A:
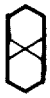
Figure 8C:
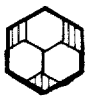
Figure 9B:
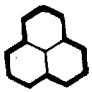
Figure 9D:
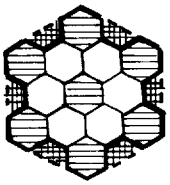
Figure 9E:
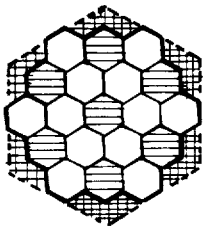
Figure 11:
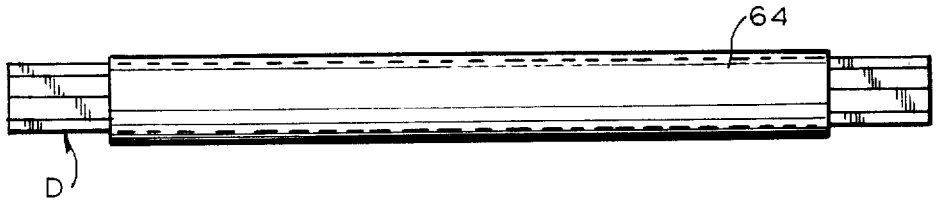
Figure 12:
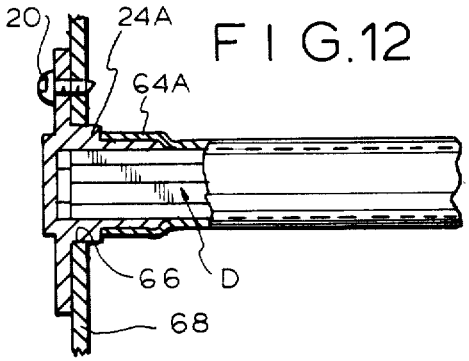
Figure 13:
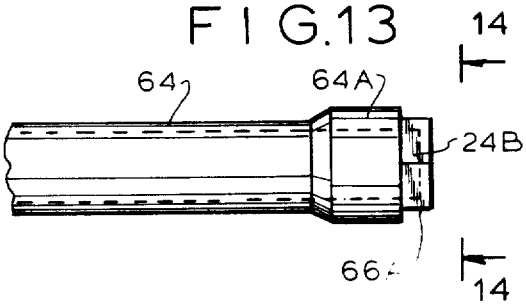
Figure 14:
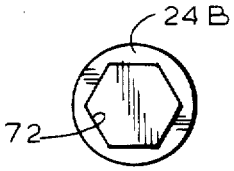
Figure 15:
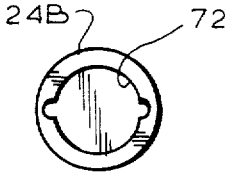
Figure 10:
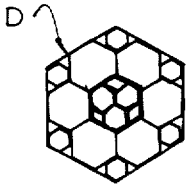

FIGS. 8A–E are schematic end views showing different arrangements of torsion members of hexagonal cross-section received in hexagonal apertures of different sizes;

FIGS. 9B and C illustrate nonhexagonal apertures for receiving two or three element torsion members respectively;

FIGS. 9D–F show different arrangements of hexagonal-cross-section torsion elements in special shaped aperture configurations and, optionally, in hexagonal apertures;

FIG. 10 is a diagramatic view showing the use of hexagonal-cross-section torsion elements of different diameters in a given hexagonal recess to form a torsion member;

FIG. 11 is a side elevational view of a torsion member of the present invention with a sheath thereover;

FIG. 12 is a side elevational view, partially broken away, of one way in which the sheathed torsion element of FIG. 11 may be mounted;

FIG. 13 is a view similar to FIG. 12 but showing another mounting arrangement;

FIG. 14 is an end view of the embodiment of FIG. 13 taken in the direction of the arrows 14—14;

FIG. 15 is a view similar to FIG. 14 but showing an alternative embodiment;

FIG. 16 is a side elevational view showing another way in which the end of the torsion member may be mounted;

FIG. 17 is a cross-sectional view taken along the line 17—17 of FIG. 16;

FIG. 18 is a side elevational view, partially in cross-section, showing how the embodiment of FIG. 11 may be mounted;

FIG. 19 is a side cross-sectional view showing the way in which the torsion element may be mounted so that its axis can be shifted; and FIG. 20 is a cross-sectional view taken along the line 20—20 of FIG. 19.

Figures 1, 2:
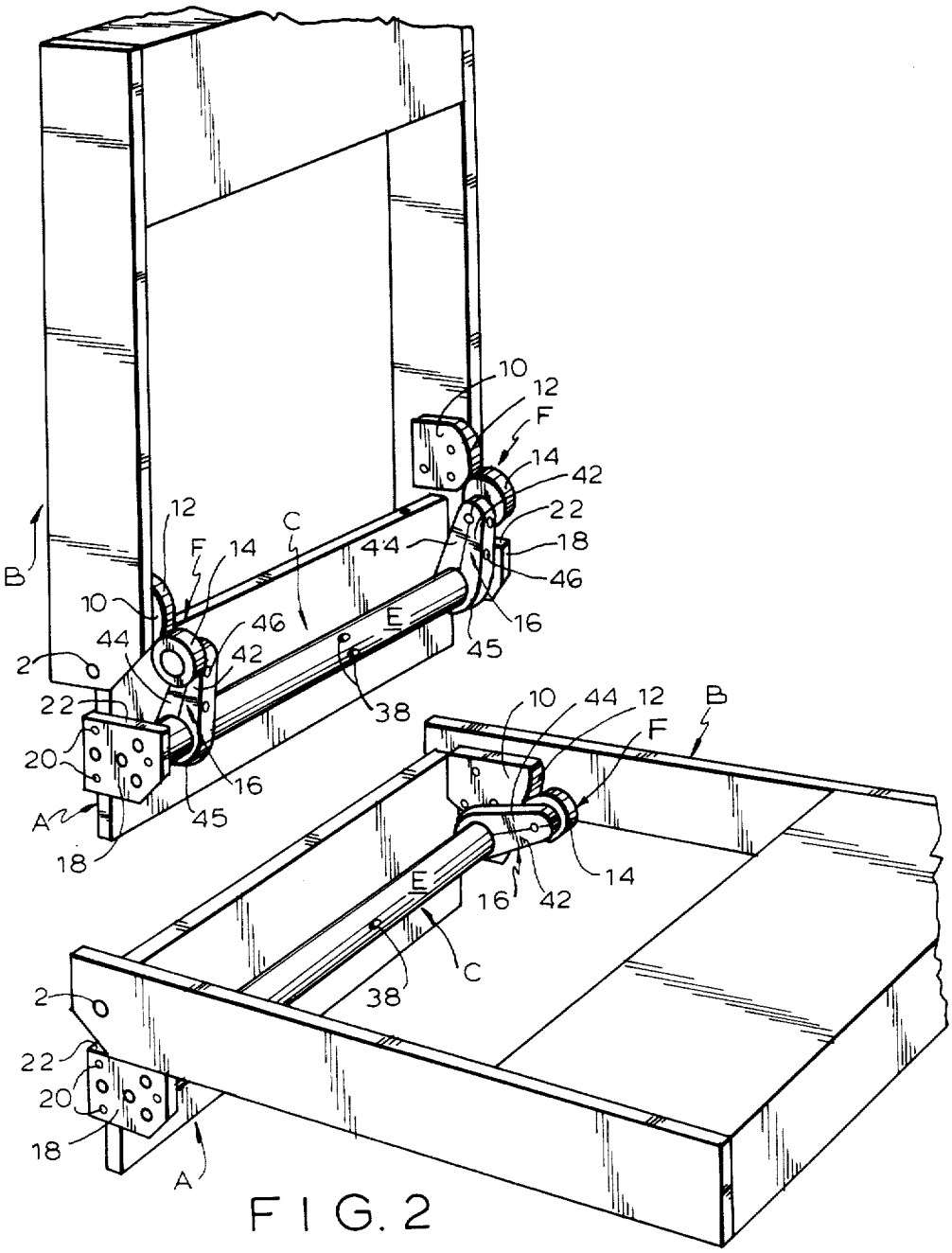
FIG. 1 is a three quarter prospective view of the counterbalance device active on a pivotable part, the part being shown in vertical position.
FIG. 2 is a view similar to FIG. 1 but showing the part in horizontal position.

Broadly considered, the counterbalance device of the present invention is designed to counterbalance two articulately connected parts generally designated A and B, here shown more or less generically because of the wide variation possible in the nature of those parts. Part A is the fixed part, and part B is the movable part which is to be counterbalanced. Part B is pivotally connected to part A by shaft 2, the pivoting as shown being between a horizontal position for part B, corresponding to a closed lid, and a vertical position thereof, corresponding to an open lid (FIGS. 2 and 1 respectively). A portion of part B is broken away so that the counterbalance device can be seen when the part B is in its horizontal position. Part B may be of appreciable weight. When it is in its vertical position shown in FIG. 1 that weight is wholly carried by the shaft 2, so little or no force is required to move the lid from its vertical position, but when the lid is in its horizontal position, as shown in FIG. 2, its weight acts downwardly at points remote from the shaft 2, so that a considerable amount of force is required to lift it. As the lid B is moved from its horizontal to its vertical position, the amount of force required to move it will progressively decrease, according to the cosine of the angle through which it is moved. What is desired is to counterbalance the part B, so that it will tend to remain in whatever position it may be placed, the counterbalancing force equalling and opposing the effective weight of the part B for that particular position.

Figure 5:
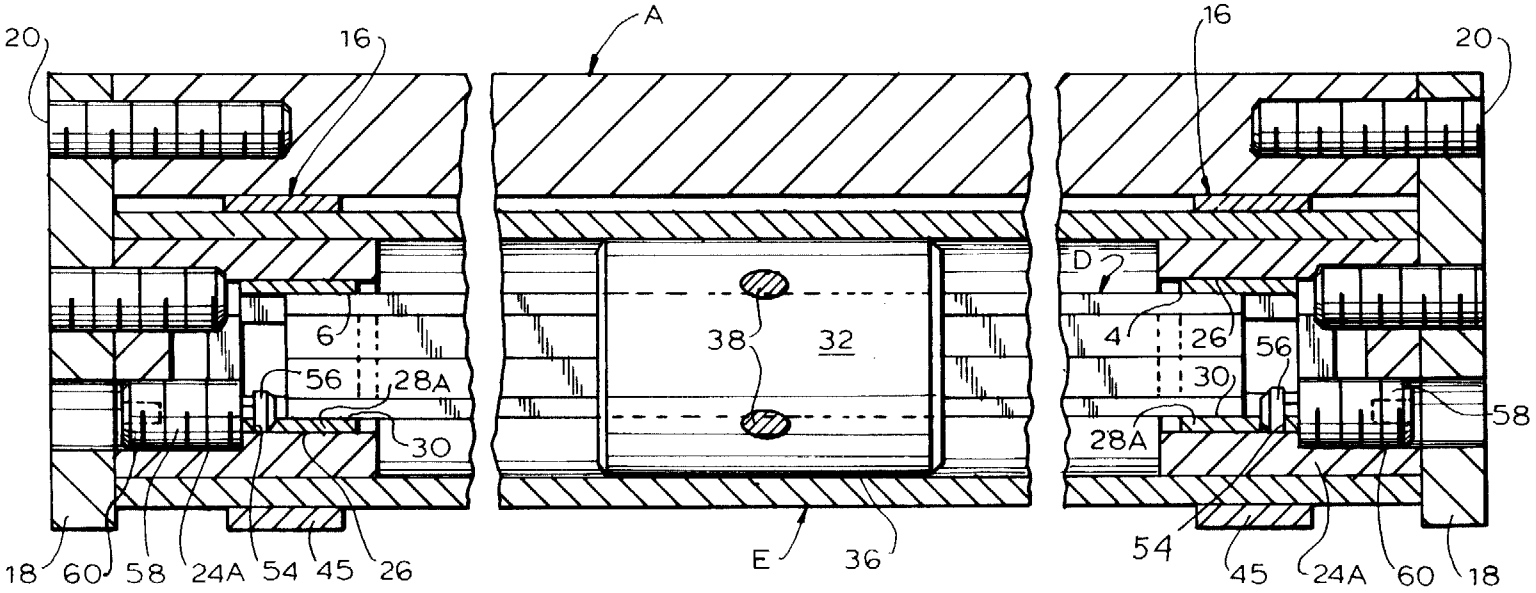
FIG. 5 is a cross-sectional view taken along the line 5—5 of FIG. 4 but showing a modified structure having adjustment capability.

The counterbalance device of the present invention, generally designated C, comprises an elongated torsion member generally designated D (see FIGS. 3, 5 and 6) which, in the balanced form here shown, is nonrotatably secured adjacent its ends, at points severally designated 4 and 6 respectively, to the fixed part A. The torsion member B is surrounded by a sleeve generally designated E, which is rotatable relative to the member D and non-rotatably secured to the torsion member D at the point generally designated 8 spaced, preferably equidistantly, from the points 4 and 6. Hence rotation of the sleeve C with respect to the fixed support A will twist the torsion member D, and that torsion member will therefore exert a restraining torque at least roughly proportional to the degree to which it is twisted.

A cam-follower combination generally designated F is provided, one part of which is secured to the sleeve C and the other part of which is secured to the other part of which is secured to the part B. As here disclosed the part B carries a cam 10 having a cam surface 12 over which a cam follower 14 rides, the cam follower 14 being mounted on the sleeve E by means of arm 16. Because of the desirable balanced nature of the construction shown, with the sleeve E engaging the torsion member D approximately mid-way along its length and with the ends of the torsion member D being engaged with the fixed support A, two sets of cam-follower combinations F are provided, one at each end of the sleeve E, thus further carrying out the disclosed balanced construction arrangement.

For securing the ends of the counterbalance devices, the fixed part A is provided with a pair of brackets 18 secured thereto by screws 20 and each optionally having an upper surface 22 on which the part B is adapted to rest when in its horizontal position. Secured to the brackets 18, and extending inwardly therefrom, are socket members 24 having at their inner ends inwardly extending polygonal recesses 26. Those recesses 26 may be of a size larger than most or all of the torsion members D expected to be used therewith. Received within the recess 26 is an adapter 28 having a polygonal outer shape corresponding to that of the recess 26 so as to be non-rotatable relative to the part 24. The inside of the adapter 28 comprises a polygonal recess 30 which non-rotatably receives the end of the torsion member D. When torsion members D of different cross-sectional sizes are used in order to produce different torque torsion elements, the only part of the construction which is non-standard, but instead is directly related to the size of the particular torsion member D, will be the adapter 28.

The sleeve E is rotatably journaled at its ends on the socket members 24, and is radially spaced from the torsion member D. In order to effect a non-rotatable connection between the sleeve E and the torsion member D, an anchor 32 having an appropriately shaped central polygonal opening 34 is slid over the torsion member D to the point 8 where connection is to be made thereto. The outer surface 36 of the anchor 32 is shaped so as to snugly fit within and be slidable along the interior of the sleeve E. The non-rotative connection between the sleeve E and the anchor 32 is effected by screw 38.

Figure 4:
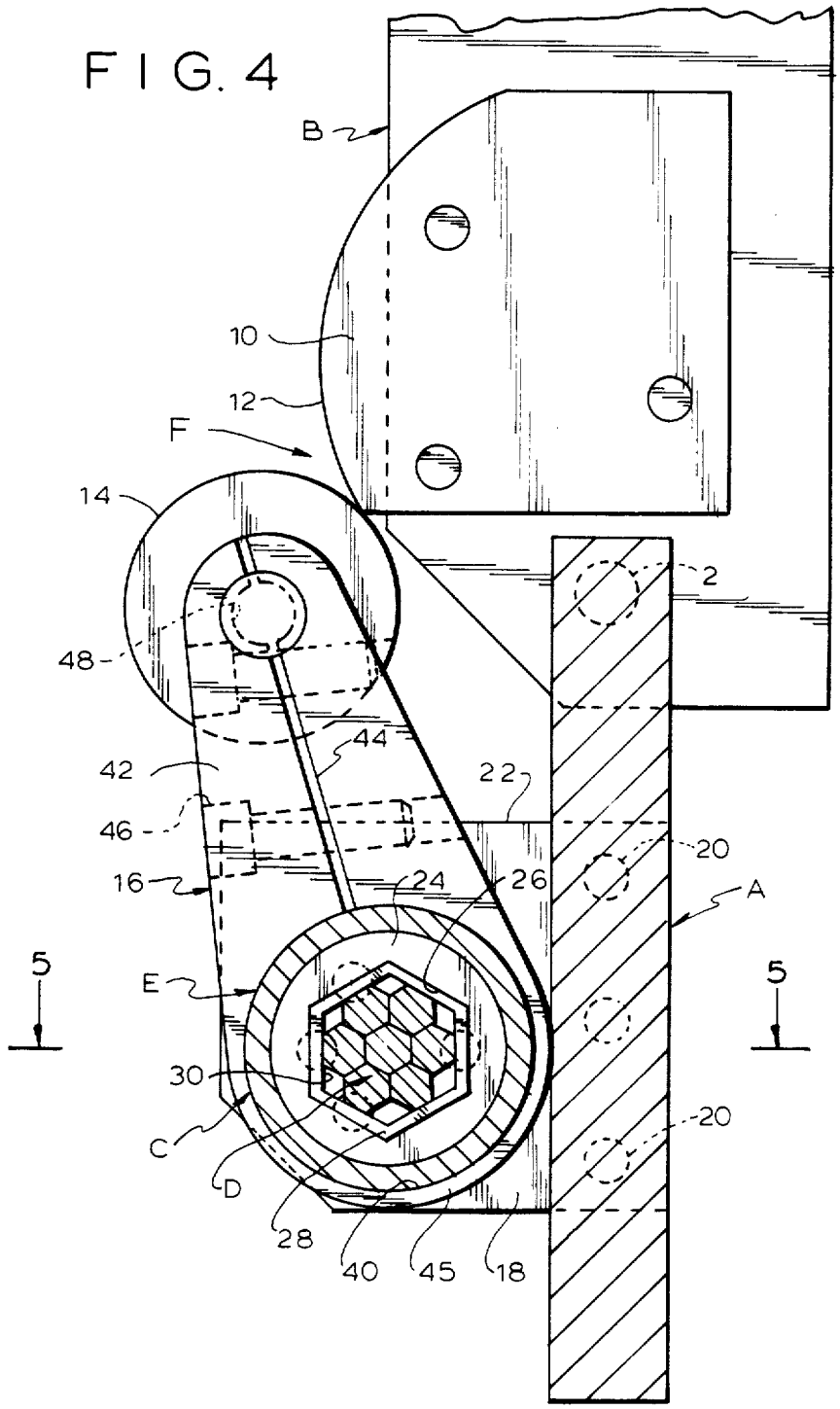
FIG. 4 is a cross-sectional view taken along the line 4—4 of FIG. 3.
Figure 6:
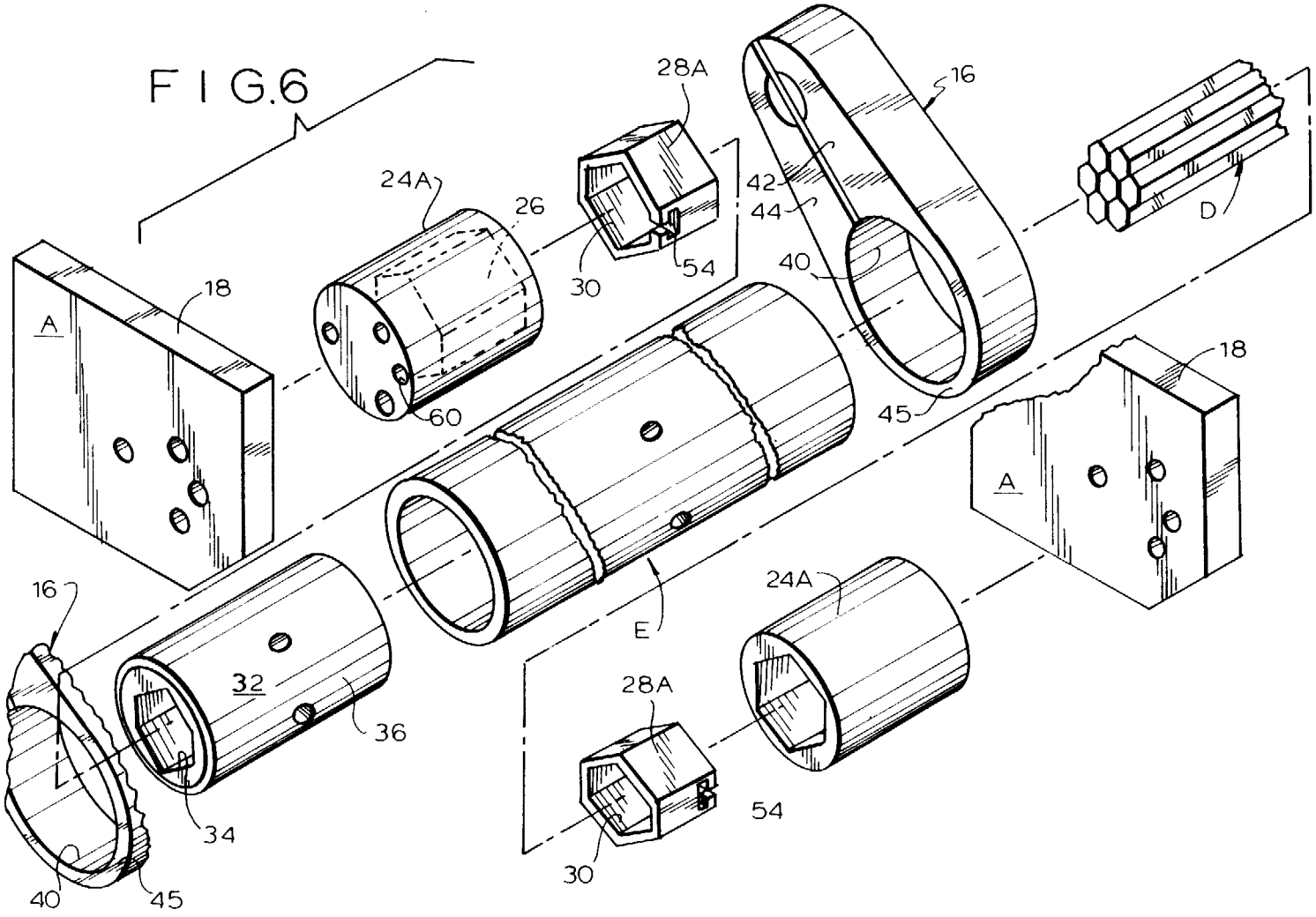
FIG. 6 is a three quarter prospective exploded view of the parts making up the counterbalance device of FIG. 5.

The arms 16 which carry the cam followers 14 may be of split construction, with cooperating parts 42 and 44 connected by curved length 45 to form central bore 40 which fits snugly over the sleeve E, as may best be seen from FIGS. 4 and 6. The arm 16 may be slid into position along the sleeve E, the arms 42 and 44 thereof then being clamped together by screws 46 so as to firmly non-rotatively clamp the arms 16 to the sleeve E. At their outer ends the arms 42 and 44 carry stud 48, preferably eccentric with respect to its extension 50 on which the cam follower 14 is journaled. This eccentricity permits a degree of adjustment in the positioning of the cam follower 14, thereby to vary the cam action, by rotating the stud 48 within the arm 16. The cam 10 is secured to the inside of the lid B, in such a position that its cam surface 12 is engaged by the cam follower 14 when the lid is in its vertical position as shown in FIG. 1.

Figure 3:
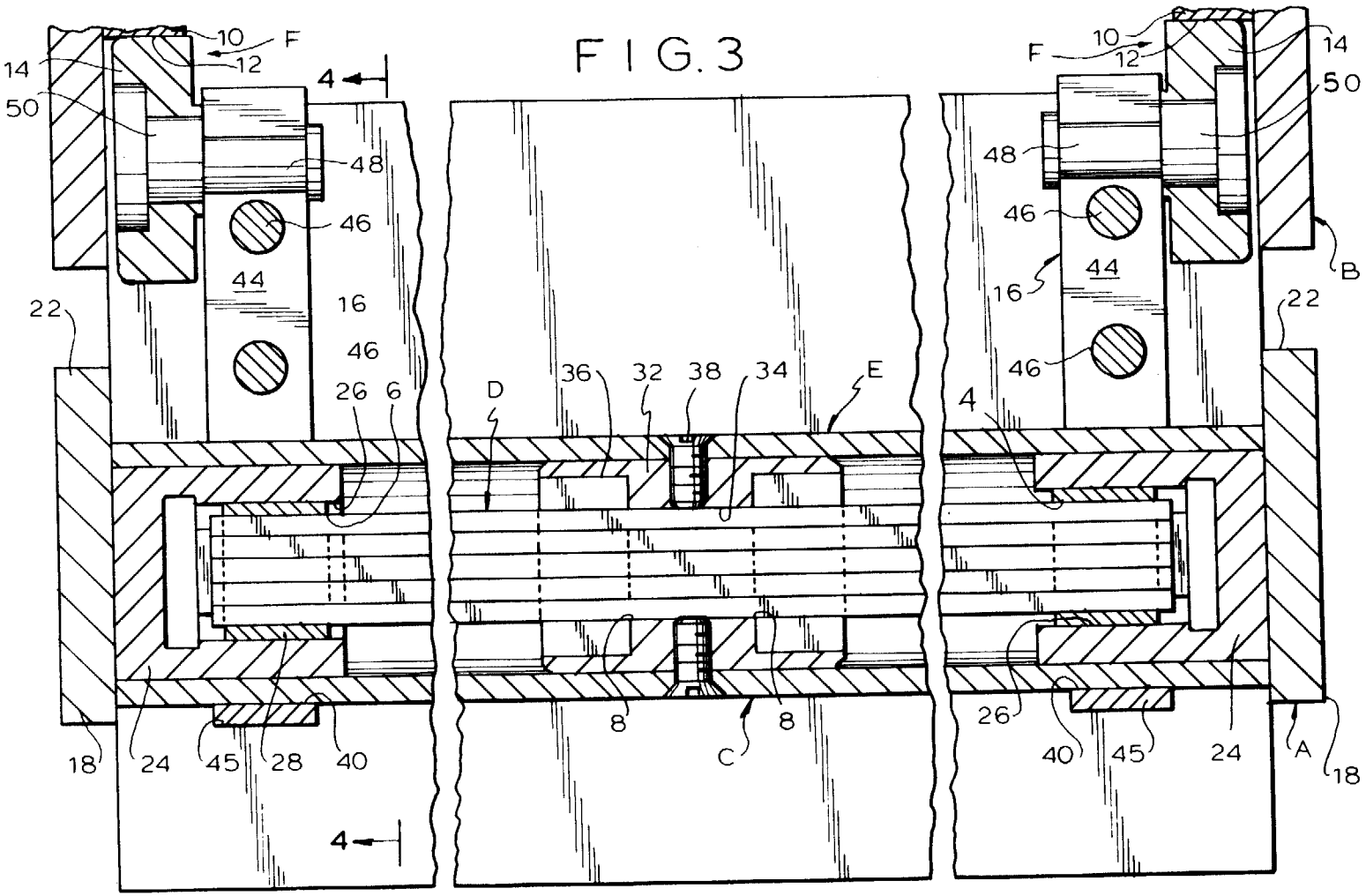
FIG. 3 is a cross-sectional view, on an enlarged scale, of the counterbalance of FIG. 1, taken along the axis thereof.

In the embodiment illustrated in FIG. 3 the adapter 28 is fixed axially within the part 24 in any appropriate manner, and hence the effective distance between the points 4 and 6 on the one hand the point 8 on the other hand remains constant, so that the resistance of the torsion member D to twisting will remain constant. The construction shown in FIGS. 5 and 6 permits the torsional characteristics of the torsion member D to be varied by adjustably changing the axial position of the adapter 28′ of that embodiment. That adapter 28′ is provided with a T-shaped slot 54 into which the head 56 projecting from screw 58 is received, that screw 58 being threadedly received in a tapped aperture 60 in the socket member 24, the screw 58 being accessible from the exterior of the bracket 18. By turning the screw 58 and thus causing it to move axially, the associated adapter sleeve 28' will also be moved axially, thereby moving the connecting point 4 or 6 closer to or farther from the connecting point 8 and thus varying the effective length of the torsion element D.

Figure 7:
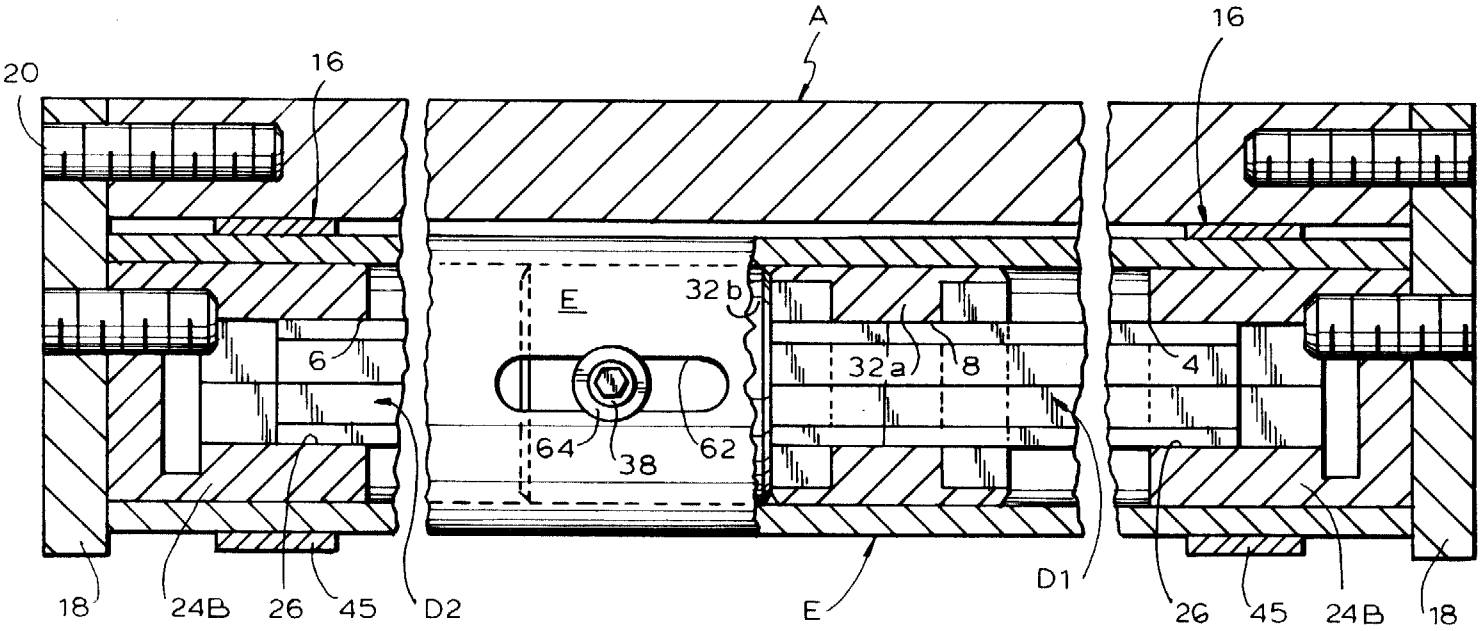
FIG. 7 is a cross-sectional view similar to FIG. 5 but showing a different way in which adjustability may be attained.

FIG. 7 illustrates an alternative construction for achieving adjustability. In the embodiment of FIG. 7 it is the point 8 which is shifted axially, rather than the point 4 or 6. To that end a pair of anchors 32A and 32B are provided, each slidable axially along the torsion member D. Each is provided with a screw 38 which passes through an elongated slot 62 formed in the sleeve E, with a washer or the like 64 pressed against the upper surface of the sleeve E by the head of the screw 38. Hence the position of each of the anchors 32A and 32B may be adjusted axially of the torsion member D to the extent permitted by the slots 62, thereby varying the effective length of those torsion members D.

It will be noted that in the embodiment of FIG. 7 an optional mounting of the ends of the torsion element D directly into the appropriately shaped openings 26 of the socket member 24 is disclosed, thus eliminating the adapter 28. This arrangement could also be used in the embodiment of FIG. 3, if the size of the torsion member D matched the size of the opening 26. It also may be noted that the construction of FIG. 7 readily permits the use of two separate and axially aligned torsion members D1 and D2, each of a length approximately half the length of the single torsion member D shown in the embodiment of FIG. 3. The screws 38 not only function to keep the anchor 32A or 32B from sliding axially with respect to the torsion member D, but also, when that torsion member D is made up of a plurality of individual elements, acts to clamp the ends of those torsion elements within the anchor 32A and thus retain the elements in position.

The torsion member D preferably comprises a plurality of elongated narrow rods of polygonal cross-section, here shown as hexagonal in cross-section. They may be made of steel or of any other structural material capable of reliably resisting torsional stresses upon repeated application of those stresses. Rods functioning as torsion springs have been known. The greater the maximum torque to be resisted, the greater has been the diameter of such rods (the term "diameter" is here used loosely to indicate maximum cross-sectional dimension, even though the cross-sectional shape is not circular), but as the diameter of the rods increased so did their stiffness, thus making them overly resistant to small forces and hence overly preventive of small movements. In the preferred form of torsion element here disclosed, made up of a plurality of relatively narrow rods grouped together in a particular fashion, that disadvantage of one piece torsion rods has been overcome—by using a plurality of rods of small cross-section grouped and mutually engaging for simultaneous twisting, structures are obtained which are capable of exerting extremely high torques while at the same time having a relatively "soft" reaction when low torques are applied, thus permitting slow build-up of torque with rotation and allowing large degrees of twisting without overstressing. Moreover, the use of a plurality of such rods permits a single standardized structure to be readily modified, for example, by changing the number of narrow torsion elements involved, to produce torsional characteristsics extending over a very wide range.

One accidental, but commercially very important, advantage of this arrangement is that rods capable of use as individual torsion elements in this application are already readily available on the market, in various sizes, since such rods are conventionally used as Allen-head wrenches. These commercially available rods are hexagonal in cross-section, which makes it exceedingly easy, from a structural point of view, to achieve a non-rotatable rotatable relationship between a torsion element formed of such rods and the parts between torsion is to be exerted.

FIGS. 8 through 14 are illustrative of some of these points.

Figure 8A:
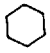
Figure 8B:
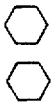
Figure 8D:
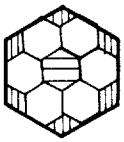
Figure 9C:
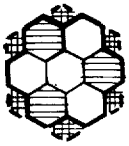

FIGS. 8A and B show respectively the shapes of the openings into which the ends of torsion elements may be received when those elements are formed respectively of one and two rods. When three rods are employed (see FIG. 8C) the ends of the rods may be received within an hexagonal opening large enough to receive all three, with voids therearound, the voids in this and other figures being represented by vertical shading. FIG. 8D shows the use of a larger hexagonal opening for receiving groups of either 6 or 7 individual rods, the optional rod being indicated in this and other drawings by horizontal shading.

Figure 8E:
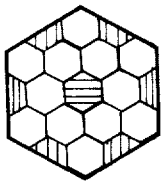

FIG. 8E discloses the use of a still larger hexagonal opening for receivng the ends of torsion elements composed of either 12 or 13 rods.

FIG. 9 is illustrative of the use of special shaped socket configurations to receive two rods (9B) three rods (9C), four through seven rods (9D), six through thirteen rods (9E) or twelve through nineteen rods (9F), the optional rods in each configuration being indicated by horizontal shading. The configuration of the special shaped sockets is indicated by heavy lines in FIG. 9. Moreover, the 4–7 rod arrangement of FIG. 9D and the 6–13 rod arrangement of FIG. 9E can be achieved in connection with hexagonal socket configurations, as indicated by the broken peripheral lines in those figures, through the use of inserts which fill the voids, represented in those FIGS. 8D-F by crossed shading.

FIG. 10 illustrates another way in which variation in torque characteristics can be achieved with a given socket configuration. In the embodiment of FIG. 14 six relatively large cross-section rods are received within the socket configuration, from one to six smaller cross-section rods may optionally be employed at the periphery, and in addition either one large sized rod or three small sized rods may be employed at the center. Since if a rod has twice the diameter, it is sixteen times as stiff, variation of stiffness in this manner is achieved.

It is also possible, as disclosed more in detail in my previously referred to application Ser. No. 422,838 entitled "Spring Hinge", to partially fill the socket opening with dummy rods, rods which do not extend to the other point of connection. Only those rods which extend between the two points of connection, and which therefore are twisted when those points have relative rotation imparted to them, contribute to the torque effect.

Once the ends of the rods are properly grasped in a socket, the rods will tend to be reliably held together, but when the sockets are separated from one another by an appreciable distance some additional means may be desired to retain the individual rods in their bundle. Moreover, it is often desired to insulate the rods from external adverse effects, such as water, dirt or acid, and it is sometimes advantageous to retain grease or other lubricant on the rods over their length. To accomplish that, as shown in FIG. 11, a sheath 64 may be provided over the bundle of rods, which sheath may be formed from a heat-shrinkable plastic material. As shown in FIGS. 12 and 13, when the ends of the torsion member D are received in socket members such as the members 24A and 24B of FIGS. 16 and 17 respectively, the ends 64A of the sheath 64 may be shrunk over the socket members, thus sealing the torsion member D quite effectively.

FIGS. 12–20 are illustrative of different ways in which the ends of the torsion member D may be connected to a part with which they are to be associated. In FIG. 12 the socket member 24A is mounted in an aperture 66 on a supporting plate 68 and is secured thereto by screws 70. In the embodiment of FIG. 13 the socket member 24B is provided at its end with an opening 72, two different embodiments of which are shown in FIGS. 14 and 15 respectively, which openings are adapted to receive matingly shaped operative elements such as shaft ends.

FIGS. 16 and 17 illustrate another type of mounting, in which the end of the torsion member D is received in a socket member 24C which is provided on its outer surface with knurling 74, so that it can be slid into an appropriately internally knurled operating element.

FIG. 18 shows a socket member 24D which is welded to a supporting element 68 and into which the end of the torsion member D is slidable, the socket member 24D having an hexagonal socket opening 76 corresponding to the size and shape of the bundle of individual torsion rods.

FIGS. 19 and 20 show how the torsion member D can be mounted in a non-perpendicular position with respect to the supporting element 68. That element is provided with a socket member 78 having an hexagonal socket opening 80. The end of the torsion member D is fixedly mounted to a head 82 which, as may be seen in FIG. 20, is hexagonal when viewed in the direction of its axis but which is ball-shaped when viewed from the side.

The conventional way to counterbalance a moving part is to provide a weight connected to that part but located on the opposite side of the pivotal axis, thereby to provide literal counterbalance. However, that approach is costly in material, significantly adds to the weight of the overall device, takes up considerable space, and is a safety hazard. Through the use of the counterbalance of the instant invention, however, no additional space is required and effective counterbalancing is achieved. Significantly, this can be done even though the maximum torque requirements may be quite high, 500 inch pounds or higher. Close approximation to the counterbalancing that is required in a given installation can be achieved through the use of the proper torsion element, such adjustment in the operative characteristics of that torsion element as are required may be achieved in a simple fashion, and then extremely accurate control of the final torque characteristics is achieved through simple cam design. The cam and spring function together to produce the desired counterbalanc effect. The counterbalance can be located off the axis of the movable part, through the use of a flexible shaft connection. The structure can be adapted to virtually any spacing on the customer's equipment—there can be dead space in the center of the counterbalance device when the spacing required by the customer is great, or, if the space required by the customer is small, an end of the counterbalance device can extend out laterally beyond the part being controlled. Balanced spring and cam action can be accomplished with but a single torsion element. Not only can the cam be shaped to produce any desired torsional response, but even a detent action can be obtained if desired simply by modifying the cam shape. Damping can be easily achieved simply by adding friction to the cam follower, but if that cam follower is relatively friction-free on the shaft on which it is mounted, the unit has very little hysteresis.

By forming the torsion member from a plurality of elongated polygonal rods formed into a bunch and mounted as disclosed, many advantages derive. For a given torque output characteristic, that arrangement takes up less weight and has a smaller diameter than a comparable coil spring, and will work in both rotative directions, whereas a coil spring will not. Over a single torsion bar it has the advantage that it can be much shorter while producing the desired degree of softness, and will allow much greater rotation without overstressing. Moreover, a wide variety of torsion characteristics can be achieved with the use of standardized construction. Although non-precision parts are involved, the torque output characteristics are quite uniform. There is a high consistency in production. The units are reliable, and very easily repaired. The individual rods are connected in parallel, so if one does break because of fatigue there is no catastrophic failure. Moreover, because of the use of a plurality of rods it is mot unlikely that any given rod will become overstressed. The torsion member is extremely silent in operation, and the bunch of rods can be sealed against the environment. Nonrotative connections to the torsion member are easy to make because of its non-circular external configuration.

For a given amount of longitudinal space, this arrangement gives softer spring rates for a given load, and has greater angular travel capability for a given load, than other types of springs. The unit can be shorter than other units, and selection of a desired number of torsion rods provides many small increments in operating characteristics.

An important factor is that the spring elements are not subjected to surge problems, which normally lead to unequal load distribution, excessive wear and oscillation.

While several embodiments of the present invention have been here disclosed, it will be apparent that they are but exemplary of other variations which could be made therein, all within the scope of the invention as defined in the following claims:

I claim:

1. A counterbalance device to act between first and second parts connected to one another to pivot about a first axis, comprising a pair of spaced supports adapted to be secured to said first part and spaced from one another along a second axis spaced from said first axis, socket members secured to said supports, extending toward one another, and having polygonal recesses facing one another along said second axis, a torsion member having ends non-rotatably received in said recesses and extending along said second axis, a sleeve extending between and mounted on said socket members to rotate relative to said socket members about said second axis, said torsion member being freely received within said sleeve, an anchor means inside said sleeve [non-rotatably mounted on said torsion member at a point spaced from said socket members, and means operatively connecting said anchor means to said second part] *and non-rotatably connected to said sleeve and to said torsion member at a first point spaced from said socket members, and means externally non-rotatably mounted on said sleeve at a second point axially spaced from said first point and operatively connecting said sleeve to said second part.*

2. In the counterbalance device of claim 1, adaptors non-rotatably received in said socket member recesses and having polygonal second recesses facing one another along said second axis, the ends of said torsion member being non-rotatively received in said second recesses.

3. The counterbalance of either of claims 1 or 2, in which said anchor means is axially adjustably slidable on said torsion member and is located approxiomately midway between said socket members.

4. The counterbalance of either of claims 1 or 2, in which said sleeve has a central aperture, said anchor means has a periphery generally corresponding to said central aperture to thereby be axially slidably adjustable within said sleeve, said anchor means having a polygonal through opening, and said torsion member is slidably but non-rotatively received within said central through opening, said anchor means being located approximately midway between said socket members.

[5. In the counterbalanc of either of claims 1 or 2, said means for operatively connecting said anchor means to said second part comprising means non-rotatably connecting said sleeve and said anchor means, and means operatively connecting said sleeve to said second part.]

6. A counterbalance device to act between first and second parts articulately connected to one another, comprising a pair of spaced supports adapted to be secured to said first part, socket members secured to said supports, extending toward one another, and having facing polygonal recesses, longitudinally extending lengths of torsion member each having an end nonrotatably received in said recesses respectively, a sleeve extending between and rotatably mounted on said socket members within which said torsion member is freely received, anchor means inside said sleeve non-rotatably mounted on said lengths of torsion members at *first* points spaced from said socket members respecctively, an arm extending radially from and non-rotatably secured to said sleeve *at a point axially spaced from said first points*, a cam adapted to be secured to said second part radially spaced from said sleeve, cam follower means on said arm engaging said cam, and means non-rotatably connecting said sleeve and said anchor means, said torsion member exerting a rotary force on said sleeve in a direction to urge said follower against said cam.

7. The counterbalance device of claim 6, in which said torsion member lengths are defined by a single longitudinally continuous structure.

8. The counterbalance device of claim 6, in which said first and second parts are connected to one another to pivot about a first axis, said torsion member and said sleeve extending along a second axis radially spaced from said first axis.

9. The counterbalance of either of claims 6 or 8, in which there are two sets of arms, cams and cam followers axially spaced from one another along the axis of said sleeve.

10. The counterbalance of either of claims 6 or 8, in which there are two sets of arms, cams and cam followers axially spaced from one another along the axis of said sleeve and axially spaced from said anchor means.

11. The counterbalance of either of claims 6 or 8, in which there are two sets of arms, cams and cam followers axially spaced from one another along the axis of said sleeve and axially spaced from said anchor means, said arms being axially adjustably positionable along said sleeve.

12. The counterbalance of either of claims 6 or 8, in which there are two sets of arms, cams and cam followers axially spaced from one another along the axis of said sleeve, said arms being axially adjustably positionable along said sleeve.

13. In the counterbalance device of either of claims 6 or 8, adaptors non-rotatably received in said socket member recesses and having polygonal second recesses facing one another, the ends of said torsion member being non-rotatably received in said second recesses.

14. A mechanism including a first member and a second member and a pivotal connection securing said members together for relative movement about a pivotal axis, and a torsion-spring mechanism for providing spring bias between said members about said pivotal axis, said torsion-spring mechanism including (a) first and second bearings secured to said first member at spaced-apart locations, said first and second bearings being mutually aligned along a torsion spring axis parallel to said pivotal axis, (b) an elongated tube coaxial with said torsion spring axis and having opposite ends pivotally supported by said first and second bearings, respectively, (c) an elongated torsion spring unit extending along said torsion spring axis and contained in said tube, said first bearing including means for fixing a first portion of said torsion spring unit at an end thereof against turning about said torsion spring axis relative to said first member, and means acting on a second portion of said torsion spring unit spaced substantially along said torsion spring axis from said first bearing for securing said second portion against turning relative to said tube, and (d) cam means including a cam secured to said second member and a cooperating cam-follower arm projecting from said tube and secured thereto for applying spring bias between said first and second members as developed by said torsion spring unit and modified by said cam means, (*e*) *said cam-follower arm being located on said tube at a point axially spaced from said means acting on a second portion of said torsion spring.*

15. A mechanism as in claim 14, wherein said elongated torsion spring unit has a third portion at the end of said unit remote from said first portion and spaced substantially along said torsion spring axis from said second portion, wherein said second bearing includes means for fixing said third portion of the torsion spring unit against turning about the torsion spring axis relative to said first member.

16. A mechanism as in claim 14, further including a second elongated torsion spring unit contained in said tube, said second bearing including means fixing a first portion of said second torsion spring unit against turning about said torsion spring axis relative to said first member, and means acting on a second portion of said second torsion spring unit spaced substantially from said second bearing for securing said second portion of said second torsion spring unit against turning relative to said tube.

17. A mechanism as in claim 14 wherein said elongated torsion spring unit comprises a bundle of rods each of which has a regular polygonal cross-section and wherein each of said means for securing said first and second portions against turning includes a respective socket having a cavity that receives a respective portion of the bundle of rods, the cross-section of each cavity having facets that bear against respective facets of at least certain of the polygonal rods.

18. A mechanism as in claim 15, wherein said elongated torsion spring unit comprises a bundle of rods each of which has a regular polygonal cross-section and wherein each of said means for securing said first, second and third portions of the torsion spring unit against turning includes a respective socket having a cavity that receives a respective portion of the bundle of rods, the cross-section of each cavity having facets that bear against respective facets of at least certain of the polygonal rods.

19. A mechanism as in claim 16, wherein each of said torsion spring units comprises a bundle of rods each of which has a regular polygonal cross-section and wherein the means for securing each of the first and second portions of each of said torsion spring units, respectively, against turning includes a respective socket having a cavity that receives a respective portion of one of said bundles of rods, the cross-section of each cavity having facets that bear against respective facets of certain of the polygonal rods.

20. A mechanism as in any of claims 14–16, wherein said cam means includes a second cam secured to said second member and a second cooperating cam-follower arm projecting from said tube and secured thereto, said cam and its cooperating cam follower being spaced along said tube far from said second cam and said second cam follower in a balanced construction wherein said cam-follower arms are constrained by said tube to move in coordination with each other.

21. A torsion spring device including an elongated tube, a pair of bearing members aligned with each other along the axis of the tube and cooperating with opposite ends of said tube to provide bearing support for the tube, said bearings being adapted to be secured non-rotatably to an external member, said members having respective sockets that provide cavities opening toward each other, torsion spring means comprising bundled rods of regular polygonal cross-section extending axially inside said tube and having opposite end portions received non-rotatably in the cavities of said sockets, means disposed between and spaced substantially from both of said sockets for securing said tube to said bundled rods, thereby developing two lengths of bundled rods extending between said tube and said sockets, and means secured to said tube for developing torsion in said bundled rods, *said means being secured to said tube at a point axially spaced from said means for securing said tube to said bundled rods.*

22. A torsion spring device as in claim 21, wherein said bundled rods extend continuously between said opposite end portions and wherein said means for securing said tube to said bundled rods comprises at least one member fixed nonrotatably to said tube and having a passage through which said bundled rods extend nonrotatably relative to said tube.

23. A torsion spring device as in claim 21, wherein said bundled rods are divided into two endwise aligned torsion spring units each having an end portion received in a respective one of said sockets as aforesaid, and wherein said means for securing said tube to said bundled rods comprises a pair of anchor members secured non-rotatably to said tube and each of said anchor members having an opening that receives non-rotatably a portion of a respective one of said torsion spring units.

* * * * *